United States Patent Office 2,963,518
Patented Dec. 6, 1960

2,963,518

CATALYTIC THERMAL TREATMENT OF XYLENE-CONTAINING HYDROCARBONS

James L. Amos, Midland, and Frederick J. Soderquist, Essexville, Mich., assignors to The Dow Chemical Company, Midland, Mich., a corporation of Delaware No Drawing. Filed Sept. 24, 1954, Ser. No. 458,255

8 Claims. (Cl. 260—672)

This invention concerns a method for a catalytic thermal treatment of a xylene, alone or in admixture with one or more isomers thereof, to demethylate xylene and produce one or both of the compounds toluene and benzene therefrom. It pertains especially to such treatment of hydrocarbon mixtures comprising two or more of the isomeric xylenes. It pertains more particularly to such treatment of hydrocarbon mixtures comprising one or more of the isomeric xylenes together with ethylbenzene to dehydrogenate the latter to styrene while at the same time demethylating part of the xylene and thus forming one or both of the compounds toluene and benzene. The invention comprises further steps for separating the reaction products from the unconsummed portion of the xylene to recover the latter in a form of good purity.

A large part of the xylene commercially available comprises a mixture of isomeric C-8 hydrocarbons including the isomeric xylenes and ethylbenzene. Often a minor amount, e.g. 10 weight percent or less, of aliphatic hydrocarbons of close to the same boiling range as the xylenes and ethylbenzene are also present. Ethylbenzene and the several xylenes isomeric therewith all boil within a few degrees centigrade of one another, their individual boiling temperatures at atmospheric pressure having been reported to be: ethylbenzene, 136.15° C.; para-xylene, 138.5° C.; meta-xylene, 138.8° C.; and ortho-xylene, 144.0° C. Although at least part of the ortho-xylene can be separated by fractional distillation of the mixture, such a separation of the other isomers is extremely difficult, if not impossible. When para-xylene is present in a sufficiently large proportion, part of it can be separated by fractional crystallization, but the mother liquor remains as a mixture of isomeric hydrocarbons. Because of the difficulty and expense involved in separating these isomeric C-8 aromatic hydrocarbons, the mixture is usually marketed as a low-priced solvent, even though certain of its individual ingredients are of greater value.

A number of chemical treatments have heretofore been proposed for producing more valuable products from certain of the above-mentioned isomeric C-8 hydrocarbons present in technical grades of xylene, or for isomerizing the hydrocarbons so as to change the molecular ratio between the several isomers in a manner such as to facilitate separation of one or more of the isomers from the mixture. For instance, Mattox, in U.S. Patent No. 2,376,709, forms styrene from a mixture of ethylbenzene and meta- and para-xylenes (which is obtained as a fraction of the product resulting from the catalytic or thermal reformation of straight-run gasoline with or without the addition of hydrogen to increase the antiknock value of the gasoline) by vaporizing said fraction and passing the hydrocarbon vapors through a bed of a dehydrogenation catalyst, such as alumina, alone or activated with an oxide of chromium, molybdenum, or vanadium, at a temperature of from 450° to 700° C. The patent teaches that its process may be carried out continuously by utilizing two or more catalyst chambers, the catalyst in each chamber being alternately contacted with the reaction vapors and with a regenerating medium. It teaches that under its reaction conditions the xylenes are inactive and serve as a diluent for the ethylbenzene and styrene. The example of the patent indicates that styrene is produced in a yield corresponding to about 60 percent of the volume of the ethylbenzene in the hydrocarbon feed mixture and that unconsummed ethylbenzene is recovered in admixture with the xylenes.

Bradley and Parr, pages 737–744 of Chem. and Met. Eng. of October 11, 1922, describe an extensive study as to the thermal decomposition of xylenes in undiluted form and in the presence of various gaseous diluents and in contact with a variety of solid materials. They report that the thermal stability of the xylenes and the kinds of principal products formed varied widely with changes in the kinds of gaseous diluents and contact masses employed. Hydrogen and methane, when employed as diluents, exhibited a stabilizing effect and permitted formation of toluene or benzene from the xylene. Metal oxide surfaces promoted decomposition of the xylenes into carbon and gaseous products. Use of ethylene as the gaseous diluent at slightly lower temperatures is reported to have caused a building up of the xylenes into higher boiling products, a majority of which were solid at room temperature. Gaseous diluents such as carbon dioxide, carbon monoxide, air, or superheated steam are reported to have exhibited a deadening effect, similar to that observed when a catalyst becomes poisoned, with a result that the hydrocarbons, i.e. xylenes, were most stable.

Yukhnoskii, Ukrainskii Khem. Zhurnal 3, No. 2, Pt. Techn., 65–87 (1928), observed that prior investigators differed from one another as to the kinds of products obtained by the thermal treatment of aromatic hydrocarbons such as xylene and that their teachings, although probably correct, often appeared to be contradictory. He made an independent investigation similar to that of Bradley and Parr, described above, and with similar results. Many of his experiments were carried out using hydrogen as a diluent for the xylene and testing the action of various solid contact masses. He reported that the reaction of hydrogen with xylene to demethylate the latter occurred more favorably in contact with a body of aluminum oxide in a chamber coated with iron sulfide than when using other contact materials. Iron and nickel, when employed as contact masses, caused carbonization of the xylene.

Bennett et al. in U.S. Patent No. 2,564,388, cite Pitzer et al., Bur. Standards J. Research 37, 95 (1946), as giving the relative concentrations of ethylbenzene and the three isomeric xylenes in equilibrium with one another at various temperatures and teach a method whereby mixtures of these compounds in other proportions can be isomerized to approach the equilibrium composition. Their isomerization method involves passing vapors of the hydrocarbon mixture and steam, or preferably hydrogen, over a clay-type of cracking catalyst at temperatures between 800° and 1100° F. They point out that ethylbenzene is much more easily cracked than are the xylenes and that because the ethylbenzene becomes cracked, i.e. thermally decomposed with breaking of carbon-to-carbon linkages in the molecule, very little xylene can be formed by isomerization of the ethylbenzene. They comment that the ethylbenzene in their feed mixture, although partially consumed due to cracking, serves to retard further formation of the same from the xylene and thus prevents a loss of xylene.

It will be evident from the above-mentioned teachings in the art, that the xylenes and the ethylbenzene isomeric therewith, are capable of undergoing any of a number of thermal reactions to form a variety of different products and that seemingly slight changes in one or more of the reaction conditions, especially in the kind of diluent or catalyst present, often results in a change in the kinds of principal products obtained.

An object of the present invention is to provide a catalytic method whereby any one or more of the xylenes can be demethylated, without excessive occurrence of cracking reactions, to obtain good yields of toluene and/ or benzene. Another object is to provide such a method which can be practiced in a continuous manner without need for periodically interrupting the reaction to regenerate, i.e. reactivate, the catalyst. A further and important object is to provide such a method whereby a mixture of ethylbenzene and one or more of the xylenes can be reacted to simultaneously demethylate part of the xylene and dehydrogenate the ethylbenzene to form styrene. Another object is to provide convenient ways of removing the reaction products, especially styrene, so as to recover the unconsumed xylene in a form relatively free of ethylbenzene. Other and related objects will be evident from the following description of the invention.

It has now been found that by passing a mixture of steam and one or more of the xylenes, alone or together with ethylbenzene, over a self-regenerative dehydrogenation catalyst at temperatures between 600° and 800° C., preferably from 650° to 750° C., a portion of the xylene becomes demethylated to form one or both of the compounds, toluene and benzene, in good yield, based on the amount of xylene consumed. It has also been found that when ethylbenzene is present in the feed mixture, it becomes dehydrogenated to form styrene in good yield. When ethylbenzene and a xylene are present in the feed mixture, both of these reactions occur simultaneously and as the principal reactions. The discovery that, under the reaction conditions of the invention, ethylbenzene can be dehydrogenated to form a good yield of styrene while xylene is undergoing demethylation to form toluene or benzene is surprising in view of the teaching in the art that ethylbenzene undergoes cracking, i.e. breakage of carbon-to-carbon linkages in the molecule, more readily than xylene. It has further been found that the isomeric xylenes differ from one another as regards the effect of an increase in temperature on their relative rates of reaction in the presence of the catalysts and that the effect of a given temperature change on their relative temperature-reaction rate gradients is dependent in part on the relative proportions of the isomeric xylenes in the feed mixture.

Under similar test conditions in accordance with the method of the invention, para-xylene has been found to undergo demethylation more rapidly than either of the other xylenes. When a feed mixture contains steam and about equimolecular proportions of two or more of the xylenes and the temperature of the reaction vapors in contact with the self-regenerative catalyst is sufficiently high, e.g. at 750° C. or thereabout, to fully activate all of the isomeric xylenes, the para-xylene appears to be the most rapidly reactive and the meta-xylene the least reactive, but as the temperature is decreased, e.g. to about 650° C., the rates of demethylation of the isomeric xylenes present in about equimolecular proportions become more nearly the same. However, when two or more xylenes in the feed mixture are not in approximately equimolecular proportions and the temperature does not greatly exceed that necessary for occurrence of the demethylation reaction, it has been observed that the isomer present in greatest proportion reacts more rapidly, i.e. undergoes a greater percent conversion, than the xylene present in smallest proportion in the feed mixture. On the other hand, an increase in the reaction temperature, e.g. in the range of from 600° to 750° C., usually causes a greater increase in the rate of reaction of the xylene present in smallest proportion in the feed mixture than of the xylene present in largest proportion. Thus, by choice of suitable reaction conditions, especially a suitable reaction temperature, certain of the isomeric xylenes in a hydrocarbon feed mixture can preferentially be demethylated so as to enrich the unconsumed portion of the xylenes in a desired isomer. Most of the aromatic C-8 mixtures commercially available are richer in meta-xylene than in the ortho- and para-xylenes. Accordingly, when using such readily available C-8 feed mixtures, the proportion of meta-xylene in the unconsumed portion of a mixture of the same and one or both of the other xylenes usually becomes greater as the reaction temperature is raised, e.g. from 600° to 750° C. Conversely, with such a feed mixture, the proportion of para-xylene in the unconsumed portion of a mixture of the same and one or both of the other xylenes usually becomes greater as the reaction temperature is lowered.

It has further been found that when a hydrocarbon feed mixture comprising ethylbenzene and one or more of the xylenes is employed in the method of the invention, the yield of styrene, based on the amount of ethylbenzene fed to the reaction, can be increased considerably by direct heating, e.g. external heating, of the reaction vapors in contact with the self-regenerative catalyst. This effect of direct heating of such vapors in contact with the catalyst is surprising, since it is known that when a mixture of ethylbenzene and steam is passed through a bed of dehydrogenation catalyst at a reaction temperature, the yield of styrene is approximately the same regardless of whether all of the heat is supplied by preheating the inflowing reaction vapors, or part of the heat is supplied by direct heating of the vapors in contact with the catalyst. The reason why a vapor mixture of steam, ethylbenzene and one or more of the xylenes differs in this respect from a vapor mixture of steam and ethylbenzene is not known with certainty. It is believed that the reaction for demethylation of part of the xylene has an effect of reducing the activity of a self-regenerative dehydrogenation catalyst in promoting the dehydrogenation of ethylbenzene to form styrene and that direct heating of the reaction vapors in contact with the catalyst so as to supply, or replace, at least part of the heat consumed in the endothermic demethylation and dehydrogenation reactions activates the catalyst and renders it more effective for the production of styrene from the ethylbenzene. It is not necessary that the direct heating of the vapors in contact with the catalyst be controlled to maintain any particular temperatures, throughout a bed of the catalyst. The direct heating has been found to be effective in increasing the yield of styrene from a mixture of steam, ethylbenzene and xylene at each of several different temperatures extending over a range of more than 100° C., and it has also been effective when an excess of heat over that required for the reactions was supplied by preheating the reaction vapors prior to contact with the catalyst. Also, it has been effective in increasing the yield of styrene even when large temperature differences, e.g. of 100° C. or more, existed between different points in the catalyst bed. However, for uniformity of operation, it is desirable that the direct heating of the vapors in contact with the catalyst be controlled so as to minimize the temperature differences within the bed, e.g. so as to maintain the vapors throughout the bed at temperatures within a range of about 50° C. Heat may be supplied directly to the vapors flowing in contact with the catalyst in any of the usual ways, e.g. by external heating of the reaction chamber containing the catalyst.

A number of self-regenerative dehydrogenation catalysts suitable for use in the method of the invention are known in the art. All of such catalysts comprise one or more metal compounds, usually heavy metal oxides, e.g. ferric oxide and/or chromium oxide; which are effective in promoting dehydrogenation reactions, such as the dehydrogenation of ethylbenzene to form styrene, and a basic potassium compound, such as potassium carbonate or potassium oxide, to catalyze and cause occurrence of a water-gas reaction. Other ingredients such as fillers and binders are often included in the catalysts. U.S. Patents 2,395,875 and 2,426,829 disclose certain self-regenerative dehydrogenation catalysts e.g. ones which, on a percent by weight basis, have the following respective compositions: (a) a catalyst containing 72.4 percent of MgO, 18.4 percent of $Fe_2O_3$, 4.6 percent of $K_2O$ and 4.6 percent of CuO; (b) a catalyst containing 98 percent of $Fe_2O_3$ and 2 percent of $K_2O$; (c) a catalyst containing 93 percent of $Fe_2O_3$, 5 percent of CuO and 2 percent of $K_2O$; (d) a catalyst containing 93 percent of $Fe_2O_3$, 5 percent of MgO and 2 percent of $K_2O$; and (e) a catalyst containing 93 percent of $Fe_2O_3$, 5 percent of $Cr_2O_3$ and 2 percent of $K_2O$. Other catalysts of this type are described in the examples which follow. A variety of self-regenerative dehydrogenation catalysts have been tested in the process of the invention, and all have been found to be satisfactorily effective.

In practice of the invention, a vapor mixture comprising steam and one or more of the xylenes is passed over a granular, or powdered, self-regenerative dehydrogenation catalyst at a reaction temperature between 600° and 800° C. and the effluent vapors are cooled to condense the aromatic products. The feed mixture contains a considerable amount, e.g. at least 1, usually from 2 to 10 or more, and preferably from 2.5 to 5, parts by weight of steam per part of the hydrocarbon, or hydrocarbons, present. The mixture may be heated to the reaction temperature in any of the usual ways. For instance, a liquid mixture of water and the hydrocarbon feed material can be heated to vaporize the same and the vapor mixture be fed to the reaction. A usual procedure is to vaporize the hydrocarbon feed material and pass its vapors into admixture with steam which has been superheated sufficiently to bring the resulting mixture to the desired reaction temperature. Other ways of mixing and heating the feed materials are evident and can be employed. Regardless of how the vapor feed mixture is brought to the reaction temperature, it is desirable, but not essential, that the vapors be heated directly while in contact with the catalyst to an extent such as to provide at least part of the heat required for the reaction. Direct heating of the reaction vapors in contact with the catalyst is of particular advantage when the vapors comprise ethylbenzene, since it results in an improved yield of styrene. Aliphatic hydrocarbons, if present in the feed mixture, do not interfere seriously with operation of the process. The organic layer of the condensate is separated from the aqueous layer, if any.

When one or more xylenes are the only C-8 aromatic ingredients of the feed mixture, toluene, or benzene, or a mixture thereof is obtained as the principal product together with unconsumed xylene. Either or both of these products can be separated by fractional distillation from the xylene. As hereinbefore mentioned, the reaction conditions, particularly the temperature, can be controlled so as to cause a preferential demethylation of certain of the xylenes in the presence of others and thus enrich the recovered xylene in a desired isomer thereof, e.g. in the meta- or para-isomer. The recovered xylene can be used for any desired purpose, e.g. as a solvent or for crystallization or other separation of the desired isomer, or it can be recycled in the process.

When the feed mixture comprises ethylbenzene together with one or more of the xylenes, styrene also is formed as a product and usually in good yield. The styrene is usually polymerized, or copolymerized with an added vinylidene compound, while present in the crude aromatic product obtained as a condensate and the other hydrocarbons present, e.g. benzene, toluene, and unreacted xylene are separated from the polymer. It has been found that acrylonitrile, in particular, copolymerizes very readily with the dilute styrene and that by adding it and heating the resulting solution, the styrene can be converted completely to the copolymer which, when separated, is useful as a molding material. Examples of other vinylidene compounds which may be added and copolymerized with the dilute styrene are methyl acrylate, ethyl acrylate, and methyl methacrylate. In instances in which an insoluble copolymer, e.g. of styrene and acrylonitrile, is formed, most of the liquid hydrocarbons can be removed by filtering or decanting and the remainder can be vaporized from the polymeric product. When a soluble polymer is formed, the liquid hydrocarbons may be removed and recovered by distillation. The toluene and/or benzene products can be distilled from the crude pyrolysis mixture prior to, during, or after the polymerization, or copolymerization, of the styrene. The xylene is preferably removed and recovered after completing the polymerization. Due to consumption of ethylbenzene in the reaction, the recovered xylene is usually more nearly pure, and of greater value, than the hydrocarbon feed mixture. It is possible, in practice of the invention, to react nearly all of the ethylbenzene by a single pass of the hydrocarbon feed material together with steam over the self-regenerative catalyst, in which case the unconsumed xylene can readily be recovered in a form of high purity.

The following examples describe ways in which the invention has been practiced, and illustrate certain of its advantages, but are not to be construed as limiting the invention.

EXAMPLE 1

Steam and a technical quality of xylene, having a composition of approximately 35.4 percent by weight of ethylbenzene, 17.4 percent ortho-xylene, 35.1 percent meta-xylene, and 12.1 percent para-xylene, were passed at rates of 120.6 grams of steam and 40.4 grams of the hydrocarbons per hour through an externally heated reaction chamber containing a 70 cc. bed of a granular, self-regenerative, dehydrogenation catalyst. The catalyst was composed of 30 weight percent of ferric oxide, 30 percent zinc oxide, 9 percent sodium dichromate, 9 percent cuprous oxide, 9 percent potassium carbonate, 5.1 percent graphite, 4 percent methyl cellulose, and 3.9 percent of an aluminum silicate cement. During operation, the temperature was continuously determined by means of thermocouples at each of a number of points throughout the catalyst bed. The maximum temperature found was regarded as the reaction temperature. The reaction temperature was successively maintained at each of the values given in Table I and the effluent vapors were cooled to condense the aromatic ingredients which were separated from the aqueous phase of the condensate and analyzed. The table gives the results obtained.

Table I

| Reaction Temp., °C. | Aromatic Compounds in Reacted Mixture | | | | | |
|---|---|---|---|---|---|---|
| | Benzene + Toluene, percent | Ethyl-Benzene, percent | Styrene, percent | Xylenes, percent | | |
| | | | | o- | m- | p- |
| 650 | 3.8 | 3.4 | 21.5 | 16.6 | 41.1 | 13.6 |
| 675 | 5.0 | 1.3 | 23.8 | 16.0 | 40.9 | 13.0 |
| 700 | 5.6 | 0.0 | 25.0 | 16.1 | 40.7 | 12.6 |

EXAMPLE 2

In an experiment which was carried out on a larger scale than that described in Example 1, a vapor mixture of about 3 parts by weight of steam and 1 part of a technical grade of xylene was passed through a reaction chamber containing a bed of a self-regenerative catalyst, similar to that employed in Example 1, while externally heating the chamber. The technical xylene feed material contained 32 percent by weight of ethylbenzene, 17.8 percent of ortho-xylene, 36.4 percent of meta-xylene, and 13.8 percent of para-xylene, based on the combined weight of these ingredients. In addition, about 5 percent of other ingredients not fully identified, but including aliphatic hydrocarbons, were present in the hydrocarbon feed material. During the reaction, the temperature was measured at each of a number of points throughout the catalyst bed. The highest and lowest temperatures found at different points in the bed were 660° and 608° C., respectively. The effluent reaction vapors were cooled to condense the steam and the aromatic ingredients and the organic layer of the condensate was separated. The organic layer was flash distilled under vacuum to remove a minor amount of tarry material. The distillate contained 2.8 weight percent of benzene, 13.8 percent of toluene, less than 2 percent of ethylbenzene, 14.3 percent of ortho-xylene, 27.6 percent of meta-xylene, 8.9 percent of para-xylene, 7.4 percent of unidentified ingredients, and 23.2 percent of styrene. Acrylonitrile was added in amount molecularly equivalent to the styrene present and the resulting mixture was heated at 215° C. for 48 hours and at 125° C. for 24 hours. The resulting insoluble polymeric product was separated by decanting and was devolatilized by distilling the absorbed unpolymerized organic ingredients therefrom. The distillate was collected as five successive fractions. The liquid which was separated by decanting and each fraction of the distillate were analyzed. The residual copolymer of styrene and acrylonitrile was a clear, transparent, thermoplastic solid. Table II gives the weight percent composition of the decanted liquid and of each of the five fractions of volatile material distilled from the copolymer.

*Table II*

| Ingredients | Portions of Recovered Liquid | | | | | |
|---|---|---|---|---|---|---|
| | Sep'd by Decanting | Distillate Fractions | | | | |
| | | 1 | 2 | 3 | 4 | 5 |
| Benzene | 4 | 12 | 8 | 8 | 5 | 6 |
| Toluene | 23 | 36 | 33 | 34 | 29 | 30 |
| Ethylbenzene | 0 | ¹2 | 0 | 0 | 0 | 0 |
| o-Xylene | 20 | 11 | 13 | 13 | 15 | 12 |
| m-Xylene | 38 | 26 | 30 | 30 | 33 | 28 |
| p-Xylene | 11 | 7 | 9 | 9 | 10 | 8 |
| Acrylonitrile | <1 | 6 | 4 | 4 | 2 | 2 |
| Styrene | 0 | 0 | 0 | 0 | 0 | 0 |
| Unidentified | 3 | 2 | 3 | 2 | 6 | 14 |

¹ A detectable amount not greater than 2%

This data shows that all of the styrene was removed by formation of the styrene-acrylonitrile copolymer and that nearly all of the ethylbenzene which had been present in the impure xylene starting material had been removed, e.g. by dehydrogenation to form the styrene. The acrylonitrile, benzene, and toluene present in the recovered organic liquids have boiling points considerably lower than those of the xylenes and are readily separated from the latter by fractional distillation. The unconsumed portions of the xylenes are thus recovered in a form of high purity.

EXAMPLE 3

Crude xylene of a technical quality, and containing a large proportion of ethylbenzene, was vaporized and passed, in admixture with about 3 times its weight of steam through an externally heated bed of a self-regenerative dehydrogenation catalyst. The effluent vapors were cooled to condense the steam and aromatic ingredients and the organic layer of the condensate was separated as the crude product. The procedure in carrying out these steps was similar to that described in Example 2. A portion of the crude product was analyzed and found to contain 2.77 percent by weight of benzene, 13.76 percent toluene, 2.04 percent ethylbenzene, 14.30 percent ortho-xylene, 27.65 percent meta-xylene, 8.91 percent para-xylene, 23.19 percent styrene, and 7.38 percent of unidentified igredients. To a number of separate weighed portions of this crude product there were added the respective polymerizable vinylidene compounds named in Table III in the proportions indicated. To some, but not all, of the resulting solutions, there was added 200 parts, per million parts of the solution, of di-(tertiary-butyl) peroxide as a polymerization catalyst. Each solution was then heated in a closed container at the temperatures and for the time given in the table. Each mixture was then removed from the container and the polymer which had been formed was separated by distilling, or vaporizing, the unpolymerized ingredients therefrom. Each residual polymeric product was weighed. Table III names the polymerizable compound which was added to each portion of the crude product obtained from the catalytic pyrolysis reaction. The table gives the relative proportions, as percent by weight, of styrene and the added polymerizable compound in each mixture which was subjected to polymerization and indicates whether the polymerization catalyst was added. The table gives the conditions of time and temperature employed in carrying out each polymerization reaction. It gives the yield of polymeric product as percent of the combined weight of styrene and the added polymerizable compound present in each mixture subjected to polymerization. In the table, styrene is abbreviated as "Styr.," methyl acrylate as "M Acr," ethyl acrylate as "E Acr," and methyl methacrylate is abbreviated as "M MAcr."

*Table III*

| Run No. | Polymerizable Ingredients | | | Catalyst Added | Polymerization Conditions | | Percent Yield of Copolymer |
|---|---|---|---|---|---|---|---|
| | Styr., percent | Added Compd. | | | Time, Hrs. | Temp., °C. | |
| | | Kind | percent | | | | |
| 1 | 54.7 | M Acr | 45.3 | No | 168 | 100 | 69.3 |
| 2 | 54.7 | M Acr | 45.3 | No | 168 | 100 | 90.0 |
| | | | | | 24 | 110 | |
| | | | | | 24 | 125 | |
| 3 | 50.9 | E Acr | 49.1 | No | 168 | 100 | 56.6 |
| 4 | 50.9 | E Acr | 49.1 | No | 168 | 100 | 88.8 |
| | | | | | 24 | 111 | |
| | | | | | 24 | 125 | |
| 5 | 51.4 | M MAcr | 48.6 | No | 168 | 100 | 87.6 |
| 6 | 51.4 | M MAcr | 48.6 | No | 168 | 100 | 100.0 |
| | | | | | 24 | 110 | |
| | | | | | 24 | 125 | |
| 7 | 52.0 | M MAcr | 48.0 | Yes | 96 | 110 | 93.0 |
| | | | | | 24 | 125 | |
| 8 | 68.0 | M MAcr | 32.0 | Yes | 96 | 110 | 84.7 |
| | | | | | 24 | 125 | |
| 9 | 84.0 | M MAcr | 16.0 | Yes | 96 | 110 | 81.2 |
| | | | | | 24 | 125 | |

EXAMPLE 4

This example illustrates the effectiveness of a self-regenerative dehydrogenation catalyst in promoting the thermal demethylation of a xylene in the presence of steam. A granular catalyst similar to that described in Example 1 was employed in one of two comparative experiments. The other experiment was carried out in the absence of a catalyst using a bed of berl saddles as an inert packing in the reaction chamber. In each experiment, 40 grams per hour of liquid para-xylene and 120 grams per hour of steam were passed into admixture with one another. The resulting mixture was passed through an externally heated chamber containing a 70 cc. bed of the catalyst or the inert and non-catalytic packing material. The temperature was measured by means of thermocouples situated at several points throughout the bed and the highest temperature thus measured was recorded as the reaction temperature. In each experiment, the reaction temperature was raised from 600° to 750° C. in stages. During each such stage of operation, the effluent vapors were cooled to condense the steam and the aromatic compound, or compounds, present therein. The organic layer of the condensate was weighed and analyzed. In the experiment using berl saddles as the packing material, no reaction was observed at any of the temperature stages of from 600° to 750° C., i.e. the only aromatic material recovered from the effluent vapors was para-xylene. The following table gives the temperature levels established in the successive stages of the experiment in which the catalyst was employed. It also gives the composition of the aromatic product obtained at each reaction temperature.

*Table IV*

| Temp., °C. | Composition of Product, Weight Percent | | | | |
|---|---|---|---|---|---|
| | o-Xylene | m-Xylene | p-Xylene | Toluene | Benzene |
| 600 | Nil | Nil | 97.0 | 2.5 | 0.5 |
| 620 | Nil | Nil | 96.5 | 2.9 | 0.6 |
| 640 | Nil | Nil | 95.2 | 4.1 | 0.7 |
| 660 | Nil | Nil | 94.5 | 5.4 | 1.1 |
| 680 | Nil | Nil | 91.0 | 7.6 | 1.4 |
| 700 | Nil | Nil | 88.0 | 10.0 | 2.0 |
| 720 | Nil | Nil | 83.7 | 13.6 | 2.7 |
| 740 | Nil | Nil | 79.5 | 16.9 | 3.6 |
| 750 | Nil | Nil | 76.5 | 19.2 | 4.3 |

EXAMPLE 5

This example demonstrates that a self-regenerative dehydrogenation catalyst is more effective than a different kind of dehydrogenation catalyst in promoting the thermal demethylation of xylene to form toluene and benzene. In each of two experiments, a vapor mixture of one part by weight of para-xylene and approximately three parts of steam was passed through an externally heated reaction chamber containing a bed of a dehydrogenation catalyst. The catalyst used in one experiment was granular activated alumina. It is known to be a highly effective catalyst for the thermal dehydrogenation of ethylbenzene to form styrene, but is not a self-regenerative catalyst, i.e. carbonaceous materials form and accumulate therein and must periodically be removed by a burning-off operation. The catalyst employed in the other experiment was a self-regenerative catalyst of the kind used in Example 1. Otherwise, the two experiments were carried out in similar manner, e.g. using similar feed rates, a maximum reaction temperature of 725° C. in the catalyst beds, and similar bed volumes of the catalysts. In each experiment, the effluent vapors were cooled to condense the steam and aromatic ingredients. The organic layer of the condensate was collected in successive portions, or fractions, and each portion was analyzed to determine the amounts of toluene and benzene therein. The remainder of each fraction consisted substantially of unconsumed para-xylene. The percent by weight of toluene plus benzene in the fractions obtained in each experiment were plotted against the times, after starting the experiment, and a curve was drawn to represent the results obtained. The individual points plotted were on, or very close to, the curve. The percent by weight of toluene+benzene in the product being formed at any particular time in each experiment can be read from the curves of the graph thus prepared. Table V indicates which of the above-mentioned catalysts was used in each experiment. It gives, for each experiment, the weight percent of benzene plus toluene in the aromatic product being formed at different times after the start of each experiment. The data given in the table were taken from the above-mentioned curves that were drawn.

*Table V*

| | Catalyst | |
|---|---|---|
| Time After Start of Operation, Hrs. | $Al_2O_3$, Percent of Toluene Plus Benzene In Product Being Formed | Self-regenerative, Percent of Toluene Plus Benzene In Product Being Formed |
| 5 | 7.5 | 20.5 |
| 10 | 2.3 | 19.7 |
| 15 | 0.5 | 18.5 |
| 25 | 0.4 | 18.0 |
| 50 | 0.2 | 17.2 |
| 75 | 0.1 | 16.3 |
| 100 | 0.05 | 15.6 |

EXAMPLE 6

A pair of experiments similar to those described in Example 4 were carried out, except that the hydrocarbon feed material was not para-xylene alone, but instead was a mixture of 49.2 weight percent of o-xylene, 49.2 percent meta-xylene, and 1.6 percent para-xylene. Except for the composition of the hydrocarbon feed material, the materials employed and the procedure in carrying out the respective experiments and collecting and analyzing the products were as described in Example 4. Table VI gives the composition of the aromatic material obtained at each of the temperatures indicated in the experiment which was carried out using berl saddles, instead of a catalyst, as packing in the reaction chamber. Table VII gives similar data for the experiment in which a self-regenerative catalyst was used in said chamber.

*Table VI*

NO CATALYST

| Temp., °C. | Composition of Crude Product | | | | |
|---|---|---|---|---|---|
| | o-Xylene, Percent | m-Xylene, Percent | p-Xylene, Percent | Toluene Percent | Benzene Percent |
| 620 | 49.2 | 47.2 | 3.6 | Nil | Nil |
| 640 | 49.0 | 48.0 | 3.0 | Nil | Nil |
| 660 | 49.1 | 48.1 | 2.8 | Nil | Nil |
| 680 | 49.2 | 48.2 | 2.6 | Nil | Nil |
| 700 | 49.9 | 47.9 | 2.2 | Nil | Nil |
| 720 | 49.9 | 47.9 | 2.2 | Nil | Nil |
| 740 | 50.0 | 48.0 | 2.0 | Nil | Nil |
| 750 | 50.0 | 48.0 | 2.0 | Nil | Nil |

It is evident that a slight amount of decomposition, probably carbonization, of the meta-xylene occurred in the experiment not using a catalyst, but toluene and benzene were not formed in appreciable amount. Approximately 96.7 percent of the xylene was recovered in the product.

*Table VII*

SELF-REGENERATIVE CATALYST USED

| Temp., °C. | Composition of Crude Product | | | | |
|---|---|---|---|---|---|
| | o-Xylene, Percent | m-Xylene, Percent | p-Xylene, Percent | Toluene Percent | Benzene Percent |
| 600 | 47.8 | 46.7 | 3.2 | 1.9 | 0.4 |
| 620 | 47.8 | 47.8 | 2.0 | 2.0 | 0.4 |
| 640 | 47.8 | 46.9 | 1.7 | 3.0 | 0.6 |
| 660 | 47.0 | 46.0 | 1.5 | 4.4 | 1.1 |
| 680 | 46.1 | 45.1 | 1.5 | 5.7 | 1.6 |
| 700 | 45.4 | 44.4 | 1.4 | 6.7 | 2.1 |
| 720 | 44.4 | 43.1 | 1.2 | 8.9 | 2.7 |
| 740 | 42.8 | 41.7 | 1.2 | 10.9 | 3.4 |
| 750 | 42.1 | 41.0 | 1.2 | 11.8 | 3.9 |

In the experiment using the catalyst, 94.4 percent of the xylene feed material was accounted for in the products.

EXAMPLE 7

A pair of experiments similar to those described in Example 6 were carried out, except that in these experiments the hydrocarbon feed material was a mixture of 0.3 weight percent ortho-xylene, 95.4 percent meta-xylene, 2.5 percent para-xylene and 1.8 percent toluene. Table VIII gives the composition of the aromatic material obtained as product at each of several temperatures in presence of the self-regenerative dehydrogenation catalyst. Table IX gives similar data concerning the experiment which was carried out in the absence of the catalyst, i.e. using non-catalytic berl saddles as a packing in the reaction chamber.

Table VIII

CATALYST USED

| Temp., °C. | Composition of Crude Product | | | | |
|---|---|---|---|---|---|
| | o-Xylene, Percent | m-Xylene, Percent | p-Xylene, Percent | Toluene Percent | Benzene Percent |
| 600 | 0.8 | 94.3 | 2.6 | 2.3 | 0.0 |
| 620 | 0.6 | 94.6 | 2.4 | 2.4 | 0.0 |
| 640 | 0.5 | 94.2 | 2.3 | 2.8 | 0.2 |
| 660 | 0.4 | 93.5 | 2.2 | 3.5 | 0.4 |
| 680 | 0.3 | 91.8 | 2.1 | 5.0 | 0.8 |
| 700 | 0.3 | 90.5 | 2.0 | 5.5 | 1.7 |
| 720 | 0.3 | 86.8 | 1.9 | 8.7 | 2.3 |
| 740 | 0.2 | 83.6 | 1.8 | 11.2 | 3.2 |
| 750 | 0.2 | 82.0 | 1.7 | 12.5 | 3.6 |

Table IX

NO CATALYST USED

| Temp., °C. | Composition of Crude Product | | | | |
|---|---|---|---|---|---|
| | o-Xylene, Percent | m-Xylene, Percent | p-Xylene, Percent | Toluene Percent | Benzene Percent |
| 620 | 1.5 | 94.6 | 2.3 | 1.6 | Nil. |
| 640 | 1.1 | 94.9 | 2.4 | 1.6 | Nil. |
| 660 | 0.8 | 95.2 | 2.4 | 1.6 | Nil. |
| 680 | 0.7 | 95.3 | 2.4 | 1.6 | Nil. |
| 700 | 0.6 | 95.4 | 2.4 | 1.6 | Nil. |
| 720 | 0.5 | 95.4 | 2.4 | 1.7 | Nil. |
| 740 | 0.5 | 95.6 | 2.3 | 1.6 | Nil. |
| 750 | 0.4 | 95.5 | 2.4 | 1.7 | Nil. |

EXAMPLE 8

Another pair of experiments similar to those described in Example 6 were carried out, except that the hydrocarbon feed material of these experiments was a mixture of 39 weight percent of ethylbenzene, 59 percent meta-xylene, 0.8 percent para-xylene, and 0.7 percent toluene. Table X gives the composition of the crude aromatic product obtained at each of several temperatures in the experiment which was carried out using the self-regenerative dehydrogenation catalyst. Table XI gives similar data concerning the crude products obtained at several temperatures in the experiment carried out not using a catalyst.

Table X

CATALYST USED

| Temp., °C. | Composition of Crude Product | | | | | | |
|---|---|---|---|---|---|---|---|
| | o-Xylene, Percent | m-Xylene, Percent | p-Xylene, Percent | Toluene Percent | Benzene Percent | Ethylbenzene, Percent | Styrene, Percent |
| 600 | Nil | 59 | 0.7 | 1.6 | 0.3 | 30.0 | 8.0 |
| 620 | Nil | 59 | 0.8 | 2.2 | 0.3 | 28.0 | 10.0 |
| 640 | Nil | 59 | 0.7 | 3.6 | 0.4 | 24.0 | 12.0 |
| 660 | Nil | 59 | 0.8 | 5.2 | 0.7 | 21.0 | 13.0 |
| 680 | Nil | 58 | 0.7 | 6.0 | 1.4 | 19.0 | 15.0 |
| 700 | Nil | 57 | 0.7 | 8.3 | 1.9 | 17.0 | 15.0 |
| 720 | Nil | 56 | 0.6 | 10.7 | 2.6 | 15.0 | 15.0 |
| 740 | Nil | 55 | 0.5 | 13.5 | 3.4 | 13.0 | 15.0 |
| 750 | Nil | 55 | 0.5 | 15.0 | 4.4 | 10.0 | 15.0 |

Table XI

NO CATALYST USED

| Temp., °C. | Composition of Crude Product | | | | | | |
|---|---|---|---|---|---|---|---|
| | o-Xylene, Percent | m-Xylene, Percent | p-Xylene, Percent | Toluene Percent | Benzene Percent | Ethylbenzene, Percent | Styrene, Percent |
| 600 | Nil | 59.0 | 0.9 | 0.7 | Nil | 39.0 | Nil. |
| 620 | Nil | 59.0 | 0.8 | 0.7 | Nil | 39.0 | Nil. |
| 640 | Nil | 59.0 | 0.8 | 0.8 | Nil | 39.0 | Nil. |
| 660 | Nil | 59.0 | 0.8 | 0.7 | Nil | 39.0 | Nil. |
| 680 | Nil | 59.0 | 0.8 | 0.9 | Nil | 39.0 | Nil. |
| 700 | Nil | 60.0 | 0.8 | 1.0 | Nil | 38.0 | Nil. |
| 720 | Nil | 61.0 | 0.8 | 2.0 | Nil | 36.0 | Nil. |
| 740 | Nil | 61.0 | 0.8 | 2.9 | 0.3 | 35.0 | Nil. |
| 750 | Nil | 62.0 | 0.8 | 3.9 | 0.4 | 33.0 | Nil. |

EXAMPLE 9

Each of four different self-regenerative catalysts, hereinafter referred to as catalyst $(a)-(d)$, respectively, was employed in a series of vapor phase thermal treatments of a C-8 petroleum hydrocarbon fraction in admixture with steam. The kinds and proportions of metal compounds employed as the active ingredients of the respective catalysts were approximately as follows:

| Catalyst | Metal Compound | |
|---|---|---|
| | Kind | Weight Percent |
| a | MgO | 56.6 |
| | $Fe_2O_3$ | 14.4 |
| | $K_2O$ | 3.3 |
| | CuO | 2.3 |
| | $Al_2O_3$ | 2.2 |
| b | $Fe_2O_3$ | 30.0 |
| | ZnO | 30.0 |
| | $Na_2CrO_7$ | 9.0 |
| | $Cu_2O$ | 9.0 |
| | $K_2CO_3$ | 9.0 |
| c | $Fe_2O_3$ | 86.5 |
| | $Cr_2O_3$ | 8.0 |
| | $K_2O$ | 4.7 |
| | $K_2CO_3$ | 0.8 |
| d | $Fe_2O_3$ | 53.0 |
| | $K_2Cr_2O_7$ | 10.8 |
| | $K_2CO_3$ | 2.8 |

Ingredients of the catalysts other than those stated above consisted of fillers, binders, or other non-catalytic substances. In each experiment, a liquid C-8 petroleum refinery fraction and water were fed into a heating zone where they vaporized and the vapor mixture was heated to about 300°–350° C. The rates of flow were such as to form a vapor mixture containing from 2.8 to 3 parts by weight of steam per part of the hydrocarbons. The C-8 hydrocarbon feed material was found, by analysis, to contain 24.65 weight percent of ethylbenzene, 18.50 percent of ortho-xylene, 34.05 percent of meta-xylene, 17.19 percent of para-zylene, and 5.61 percent of aliphatic hydrocarbons and unidentified ingredients. The molecular ratio between the isomeric C-8 ingredients of the hydrocarbon feed mixture was 1.44 ethylbenzene/1.08 ortho-xylene/1.98 meta-xylene/1 para-xylene. The vapor mixture of steam and the hydrocarbons was passed through a chamber containing a bed of the granular catalyst, which chamber was externally heated to provide heat for the reactions which occurred. The temperature was determined at a number of points throughout the catalyst bed and the maximum temperature was regarded as the reaction temperature. The effluent vapors were cooled to condense the steam and the aromatic products and the two layers of the condensate were separated. The organic layer was weighed and analyzed. Table XII indicates which of the above-mentioned self-regenerative catalysts was used in each experiment, gives the reaction temperature employed in each test, gives the proportions, as percent by weight, of the various ingredients found in the organic layer of condensate obtained in each experiment, and also expresses certain of these proportions in terms of the molecular ratio of ethylbenzene/ortho-xylene/meta-xylene/para-xylene in the products. The table also gives the percent yield of styrene, based both on the amount of ethylbenzene fed to the reaction and on the amount of ethylbenzene consumed.

both experiments. In one experiment, the hot vapor feed mixture of steam and hydrocarbons was passed through the catalyst chamber without external heating of the chamber, whereas, in the other experiments, said chamber was externally heated to supply to considerable part of the heat of reaction. During each experiment the temperatures were measured by means of thermocouples lo-

Table XII

| Run No. | Catalyst | Temp. | Organic Layer of Condensate | | | | | | | | | Mole Ratio of Isomers | | | | Styrene, Percent Yield on Ethyl-Benzene | |
|---|---|---|---|---|---|---|---|---|---|---|---|---|---|---|---|---|---|
| | | | Percent Benzene | Percent Toluene | Percent Styrene | Percent Ethyl-Benzene | Xylenes | | | Percent Tar | Percent Unidentif. Ingreds. | Ethyl-Benzene | Xylenes | | | Fed | Cons. |
| | | | | | | | o-, Percent | m-, Percent | p-, Percent | | | | o- | m- | p- | | |
| 1 | a | 673 | 1.33 | 3.62 | 10.64 | 10.14 | 19.17 | 31.71 | 15.45 | 0.3 | 7.05 | 0.66 | 1.28 | 2.05 | 1 | 42.7 | 71.0 |
| 2 | a | 725 | 0.98 | 7.31 | 17.50 | 5.01 | 17.80 | 30.70 | 15.46 | 0.8 | 4.44 | 0.33 | 1.15 | 1.99 | 1 | 70.2 | 87.4 |
| 3 | b | 675 | 1.21 | 6.68 | 18.52 | 4.04 | 16.78 | 32.84 | 15.84 | 0.2 | 3.89 | 0.26 | 1.06 | 2.08 | 1 | 74.3 | 88.3 |
| 4 | b | 700 | 1.33 | 7.57 | 17.70 | 4.15 | 17.50 | 32.66 | 15.15 | 0.6 | 3.54 | 0.27 | 1.15 | 2.38 | 1 | 71.0 | 84.9 |
| 5 | c | 675 | 2.40 | 10.34 | 17.31 | 3.74 | 17.46 | 31.46 | 13.95 | 0.4 | 2.96 | 0.27 | 1.25 | 2.26 | 1 | 69.4 | 81.4 |
| 6 | c | 700 | 4.76 | 14.55 | 16.96 | 2.04 | 15.70 | 29.75 | 12.32 | 0.4 | 3.52 | 0.17 | 1.27 | 2.40 | 1 | 68.0 | 74.0 |
| 7 | d | 673 | 0.94 | 6.03 | 13.51 | 6.57 | 18.28 | 32.47 | 14.98 | 0.4 | 6.82 | 0.44 | 1.22 | 2.18 | 1 | 54.2 | 73.1 |
| 8 | d | 700 | 2.15 | 11.25 | 15.42 | 4.14 | 17.35 | 31.71 | 13.79 | 0.6 | 3.59 | 0.30 | 1.26 | 2.30 | 1 | 61.9 | 73.9 |
| 9 | d | 725 | 4.72 | 23.43 | 14.52 | 1.54 | 10.87 | 29.56 | 11.16 | 0.8 | 3.60 | 0.14 | 0.97 | 2.64 | 1 | 58.2 | 62.0 |

The table shows that all of the self-regenerative catalysts are highly effective for the formation of styrene, toluene and benzene from a mixture of ethylbenzene and the isomeric xylenes. The fact that the ratio of the combined weight of the ortho- and meta-xylenes to the para-xylene in the reaction products was always greater than in the feed mixture indicates that in most instances the para-xylene underwent demethylation more readily in the presence of steam and the self-regenerative catalysts than the other isomers, especially the meta-xylene. However, in run 9 of the table, ortho-xylene was apparently demethylated to a slightly greater extent than the para-xylene, the meta-xylene again being the least reactive of the isomers.

cated at a number of points throughout the catalyst bed. Table XIII identifies each experiment by indicating whether the catalyst chamber was externally heated. The table gives the highest and lowest of the reaction temperatures measured within the catalyst bed during each experiment. It also gives the composition of the mixture of aromatic compounds which was obtained in each experiment. It also gives, for each experiment, the percent yield of styrene based on the amount of ethylbenzene fed to the dehydrogenation reaction. In the table, benzene is abbreviated as "Bz," toluene as "Tol.," ethylbenzene as "Et Bz," and styrene is abbreviated as "Styr."

Table XIII

| Run No. | External Heating Of Catalyst Bed | Temp. Range In Catalyst Bed | Composition of Crude Product | | | | | | | | Yield of Styrene, Percent |
|---|---|---|---|---|---|---|---|---|---|---|---|
| | | | Bz Percent | Tol. Percent | Et Bz Percent | Xylenes | | | Styr., Percent | Unidentified, Percent | |
| | | | | | | o-, Percent | m-, Percent | p-, Percent | | | |
| 1 | No | 655-600 | 1.72 | 9.10 | 4.81 | 16.77 | 33.30 | 15.06 | 16.13 | 3.11 | 63.3 |
| 2 | Yes | 640-605 | 2.07 | 10.77 | 1.84 | 15.95 | 32.20 | 15.38 | 19.60 | 2.19 | 76.2 |
| 3 | Yes | 625-590 | 1.40 | 9.69 | 1.99 | 18.22 | 32.70 | 15.41 | 18.42 | 2.17 | 7.6 |

EXAMPLE 10

This example shows that when producing styrene from a mixture of ethylbenzene and xylenes by the method of the invention, it is advantageous to supply heat for the reaction by direct, e.g. external, heating of the reaction chamber containing the catalyst. In each of two experiments, a vaporized C-8 hydrocarbon mixture, having a composition of approximately 26 percent by weight of ethylbenzene, 19.3 percent ortho-xylene, 39.7 percent meta-axylene, and 15 percent para-xylene, was passed into admixture with superheated steam to form a mixture containing approximately 3 parts by weight of steam per part of the hydrocarbons. The steam had been superheated sufficiently to bring the mixture, thus formed, to about the desired reaction temperature. The vapor mixture was passed through a bed of a granular, self-regenerative dehydrogenation catalyst at a space velocity (expressed as pounds of the hydrocarbon feed material per cubic foot of the catalyst bed per hour) of 10.25±0.25. The effluent reaction vapors were cooled to condense the steam and the aromatic products and the organic layer of the condensate was separated, weighed, and analyzed. The same kind of self-regenerative catalyst was used in The table shows that by external heating of the catalyst bed during the reaction styrene can be produced in higher yield and at a lower average reaction temperature than when all of the heat is supplied by the vapor feed mixture. The table also shows that the range of reaction temperature variations within the catalyst bed can be reduced by such external heating of the bed.

EXAMPLE 11

For purpose of further testing the process to determine the effect of external heating of the catalyst bed on the yield of styrene from a vapor feed mixture of steam, ethylbenzene and the three isomeric xylenes, such a feed mixture (formed at about the desired reaction temperature and containing 18.9 weight percent of ethylbenzene in the mixture of ethylbenzene and the xylenes) was passed through a bed of a granular self-regenerative dehydrogenation catalyst for a total of about 1200 hours. The aromatic ingredients of the effluent vapors were condensed and collected in successive fractions and each fraction was weighed and analyzed to determine the proportion of styrene therein. Throughout the first approximately 400 hours of operation, the catalyst bed was externally heated. The temperature was measured at a number of points within the bed. The overall average of the minimum and maximum temperatures determined in this initial 400 hours of operation was 673° C., but the temperatures and the temperature differences in the bed fluctuated and the yield of styrene, based on the amount of ethylbenzene in the hydrocarbons fed to the reaction, fluctuated in a corresponding manner from a minimum yield of 61.1 percent to a maximum yield of 79.5 percent. During the next 600 hours or therabout of operation, the catalyst bed was not externally heated and the average of the minimum and maximum temperatures in the bed was 667.5° C. During the first 200 hours of operation without external heating of the catalyst bed, the yield of styrene decreased. During most of the remaining 400 hours of operation in this manner, the yield did not change greatly and averaged about 55 percent. External heating of the catalyst bed was then resumed and continued for about 200 hours of further operation of the process. The average reaction temperatures in this final 200 hours period was 678° C. and the average value for the range of temperature differences in the catalyst bed was only 30° C. During this final 200 hours of operation the yield of styrene, based on the amount of ethylbenzene fed to the reaction, increased to 65 percent. The supply of the hydrocarbon starting material was then exhausted and the experiment was terminated. The yield of styrene being formed was increasing when the experiment was terminated.

EXAMPLE 12

The following Table XIV summarizes data from preceding examples as to the effects of variations in the reaction temperatures, changes in the relative proportions of different xylenes in the hydrocarbon feed mixtures, and changes in the kinds of self-regenerative catalysts employed on the relative proportions of the isomeric xylenes remaining in the unconsumed portion of the hydrocarbons. In other words, the table brings out the effects of changes in these variable reaction conditions in causing a preferential demethylation of certain of the xylenes. For purpose of clarity, the table refers only to the xylenes, although certain of the feed mixtures employed also contained ethylbenzene. More detailed information as to the individual tests is to be found in the preceding examples. The table identifies the preceding examples from which the data as to the xylenes was extracted. It gives the maximum reaction temperature measured in the catalyst bed during each experiment, the kinds and relative proportions of the xylenes in each feed mixture and in the unconsumed xylenes which were recovered, and the identity of the self-regenerative catalyst employed in each experiment. In the table, the catalysts are referred to as (a)-(d). Example 9 identifies the catalysts (a)-(d).

It is evident from Table XIV that the relative proportions of the xylenes in the feed mixture and the reaction temperature each have a considerable effect in determining which of the xylenes is preferentially demethylated and that the identity of the self-regenerative catalyst has a less pronounced effect on the relative reaction rates of the xylenes. However, runs 14-22 indicate that in instances in which the xylenes are present in fairly close to equimolecular proportions, e.g. in proportions of not more than 2 moles of one isomer per mole of each other isomer, the identity of the catalyst may be controlling as to the relative rates of reaction of the xylenes. The table, as a whole, indicates that the effect of a temperature rise in increasing the rate of reaction is greater with respect to the xylene present in smallest proportion in the feed mixture than with regard to the xylene or xylenes present in major proportions.

We claim:

1. A method which comprises passing a vapor mixture of at least one part by weight of steam and one part by weight of a hydrocarbon material, comprising at least one aromatic hydrocarbon of the class consisting of xylenes and mixtures of at least one xylene and ethylbenzene, into contact with a self-regenerative dehydrogenation catalyst comprising as essential ingredients a heavy metal compound, effective as a dehydrogenation catalyst, together with a basic potassium compound at a reaction temperature between 600° and 800° C.

2. A method, as claimed in claim 1, wherein the reaction vapors are externally heated while in contact with the self-regenerative catalyst.

3. A method of demethylating a xylene which comprises passing a vapor mixture of one part by weight of xylene and from two to ten parts by weight of steam into contact with a self-regenerative dehydrogenation catalyst comprising as essential ingredients at least one of the substances, ferric oxide and chromium oxide, together with a basic potassium compound at a reaction temperature between 600° and 800° C.

4. A method as claimed in claim 3, wherein heat for the demethylation reaction is supplied by externally heating the reaction vapors while in contact with the catalyst.

5. A method as claimed in claim 4, wherein the vapor mixture flowing out of contact with the self-regenerative catalyst is cooled to condense the aromatic ingredients thereof and the liquid organic mixture thus obtained is fractionally distilled to separate therefrom at least one of the compounds toluene and benzene formed by the demethylation reaction.

6. A method of treating a hydrocarbon mixture that is rich in xylene and comprises ethylbenzene to simul- Table XIV

| Run No. | Data Taken From Example | Catalyst | Temp., °C. | Mole Ratio of Xylenes | | | | | |
|---|---|---|---|---|---|---|---|---|---|
| | | | | In Feed | | | In Recovered Xylene | | |
| | | | | o- | m- | p- | o- | m- | p- |
| 1 | 1 | b | 650 | 1.44 | 2.9 | 1 | 1.22 | 3.2 | 1 |
| 2 | 1 | b | 675 | 1.44 | 2.9 | 1 | 1.23 | 3.14 | 1 |
| 3 | 1 | b | 700 | 1.44 | 2.9 | 1 | 1.28 | 3.22 | 1 |
| 4 | 2 | b | 725 | 1.29 | 2.64 | 1 | 1.61 | 3.10 | 1 |
| 5 | 6 | b | 620 | 30.7 | 30.7 | 1 | 23.9 | 23.9 | 1 |
| 6 | 6 | b | 700 | 30.7 | 30.7 | 1 | 32.4 | 31.8 | 1 |
| 7 | 6 | b | 750 | 30.7 | 30.7 | 1 | 35.0 | 34.2 | 1 |
| 8 | 7 | b | 620 | 0.12 | 38.2 | 1 | 0.25 | 39.4 | 1 |
| 9 | 7 | b | 700 | 0.12 | 38.2 | 1 | 0.15 | 45.25 | 1 |
| 10 | 7 | b | 750 | 0.12 | 38.2 | 1 | 0.118 | 48.2 | 1 |
| 11 | 8 | b | 620 | 0 | 73.8 | 1 | 0 | 73.8 | 1 |
| 12 | 8 | b | 700 | 0 | 73.8 | 1 | 0 | 81.4 | 1 |
| 13 | 8 | b | 750 | 0 | 73.8 | 1 | 0 | 110.0 | 1 |
| 14 | 9 | b | 675 | 1.08 | 1.98 | 1 | 1.06 | 2.08 | 1 |
| 15 | 9 | b | 700 | 1.08 | 1.98 | 1 | 1.15 | 2.38 | 1 |
| 16 | 9 | a | 673 | 1.08 | 1.98 | 1 | 1.28 | 2.05 | 1 |
| 17 | 9 | a | 725 | 1.08 | 1.98 | 1 | 1.15 | 1.99 | 1 |
| 18 | 9 | c | 675 | 1.08 | 1.98 | 1 | 1.25 | 2.26 | 1 |
| 19 | 9 | c | 700 | 1.08 | 1.98 | 1 | 1.27 | 2.40 | 1 |
| 20 | 9 | d | 673 | 1.08 | 1.98 | 1 | 1.22 | 2.18 | 1 |
| 21 | 9 | d | 700 | 1.08 | 1.98 | 1 | 1.26 | 2.30 | 1 |
| 22 | 9 | d | 725 | 1.08 | 1.98 | 1 | 0.97 | 2.64 | 1 | taneously demethylate part of the xylene and dehydrogenate the ethylbenzene, which method comprises passing a vapor mixture of at least one part by weight of steam and one part by weight of said hydrocarbon mixture into contact with a self-regenerative dehydrogenation catalyst comprising as essential ingredients at least one of the substances, ferric oxide and chromium oxide, together with a basic potassium compound at a reaction temperature between 600° and 800° C.

7. A method, as claimed in claim 6, wherein the reaction vapors are externally heated while in contact with the self-regenerative catalyst.

8. A method which comprises passing a vapor mixture of at least one part by weight of steam and one part by weight of a hydrocarbon material, comprising at least one aromatic hydrocarbon of the class consisting of xylenes and mixtures of at least one xylene and ethylbenzene, into contact with a self-regenerative dehydrogenation catalyst, composed of 30 weight percent of ferric oxide, 30 weight percent of zinc oxide, 9 weight percent of sodium dichromate, 9 weight percent of cuprous oxide, 9 weight percent of potassium carbonate, 5.1 weight percent of graphite, 4 weight percent of methyl cellulose, and 3.9 weight percent of aluminum silicate cement, at a reaction temperature between 600° and 800° C.

References Cited in the file of this patent

UNITED STATES PATENTS

| | | | |
|---|---|---|---|
| 1,230,087 | Evans | June 12, | 1917 |
| 2,110,829 | Dreisbach | Mar. 8, | 1938 |
| 2,245,619 | Stearn | June 17, | 1941 |
| 2,376,709 | Mattox | May 22, | 1945 |
| 2,470,712 | Montgomery | May 17, | 1949 |
| 2,577,788 | McAteer | Dec. 11, | 1951 |
| 2,656,397 | Holzman et al. | Oct. 20, | 1953 |
| 2,734,929 | Doumani | Feb. 14, | 1956 |
| 2,754,340 | Anderson | July 10, | 1956 |

FOREIGN PATENTS

| | | | |
|---|---|---|---|
| 574,083 | France | Mar. 24, | 1924 |

UNITED STATES PATENT OFFICE
CERTIFICATE OF CORRECTION

Patent No. 2,963,518                                  December 6, 1960

James L. Amos et al.

It is hereby certified that error appears in the above numbered patent requiring correction and that the said Letters Patent should read as corrected below.

Column 8, Table III, column 7 thereof, under the heading "Temp., °C.", seventh item, for "111" read -- 110 --; column 13, line 62, for "meta-axylene" read -- meta-xylene --; columns 13 and 14, Table XIII, last column thereof, third item, for "7.6" read -- 71.6 --.

Signed and sealed this 17th day of October 1961.

(SEAL)
Attest:

ERNEST W. SWIDER                                   DAVID L. LADD
Attesting Officer                                        Commissioner of Patents
                                                                          USCOMM-DC